(12) United States Patent
Robshaw et al.

(10) Patent No.: US 9,740,891 B1
(45) Date of Patent: Aug. 22, 2017

(54) TAG-TO-TAG COMMUNICATION USING RFID READERS

(71) Applicant: Impinj, Inc., Seattle, WA (US)

(72) Inventors: Matthew Robshaw, Seattle, WA (US); Tan Mau Wu, Seattle, WA (US)

(73) Assignee: IMPINJ, Inc., Seattle, WA (US)

( * ) Notice: Subject to any disclaimer, the term of this patent is extended or adjusted under 35 U.S.C. 154(b) by 40 days.

(21) Appl. No.: 14/871,634

(22) Filed: Sep. 30, 2015

Related U.S. Application Data

(60) Provisional application No. 62/059,070, filed on Oct. 2, 2014.

(51) Int. Cl.
| | |
|---|---|
| *G06K 7/10* | (2006.01) |
| *H04L 9/08* | (2006.01) |
| *G06K 7/00* | (2006.01) |
| *A63B 71/06* | (2006.01) |

(52) U.S. Cl.
CPC ....... *G06K 7/10009* (2013.01); *G06K 7/0008* (2013.01); *G06K 7/10257* (2013.01); *H04L 9/0894* (2013.01); *A63B 71/0616* (2013.01)

(58) Field of Classification Search
CPC ........... G06K 7/10009; G06K 7/10257; G06K 7/10425; G06K 7/10475; G06K 7/0008; G06K 19/0707; G06K 19/0712; H04L 9/0894; G01S 19/42; G08B 21/0227; A63B 71/0616

USPC ................... 340/572.1, 10.1, 10.34
See application file for complete search history.

(56) References Cited

U.S. PATENT DOCUMENTS

| | | | | |
|---|---|---|---|---|
| 7,212,122 | B2* | 5/2007 | Gloekler | G01S 19/42 340/10.1 |
| 7,733,227 | B1* | 6/2010 | Pesavento | G06K 7/0008 340/10.1 |
| 8,171,289 | B2* | 5/2012 | Adler | H04L 9/0841 380/277 |
| 9,504,896 | B2* | 11/2016 | Hansen | A63B 71/0616 |
| 2014/0266612 | A1* | 9/2014 | Marten | G06K 7/10009 340/10.1 |
| 2016/0034728 | A1* | 2/2016 | Oliver | G06K 7/10257 340/10.1 |

* cited by examiner

*Primary Examiner* — Ali Neyzari
(74) *Attorney, Agent, or Firm* — Turk IP Law, LLC

(57) ABSTRACT

Messages may be passed between Radio Frequency Identification (RFID) tags using RFID readers. A first tag with a message intended for a second tag sends the message to an RFID reader. The reader then determines that the destination of the message is the second tag and sends the message to the second tag. The second tag may confirm receipt of the message by sending a receipt confirmation message to the reader for forwarding to the first tag, and/or the reader may itself confirm that the message was sent to the second tag by sending a transmit confirmation message to the first tag.

14 Claims, 10 Drawing Sheets

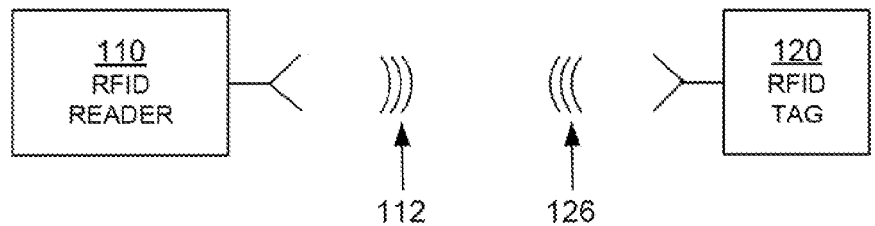
FIG. 1
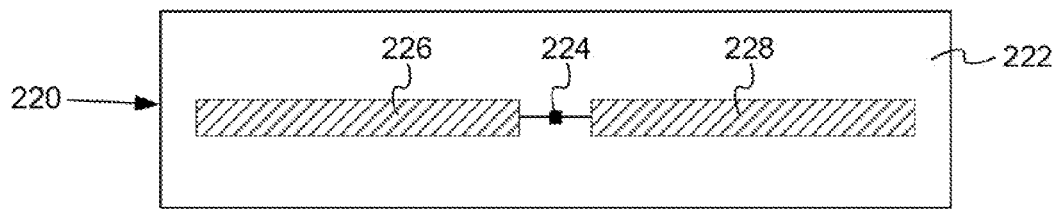
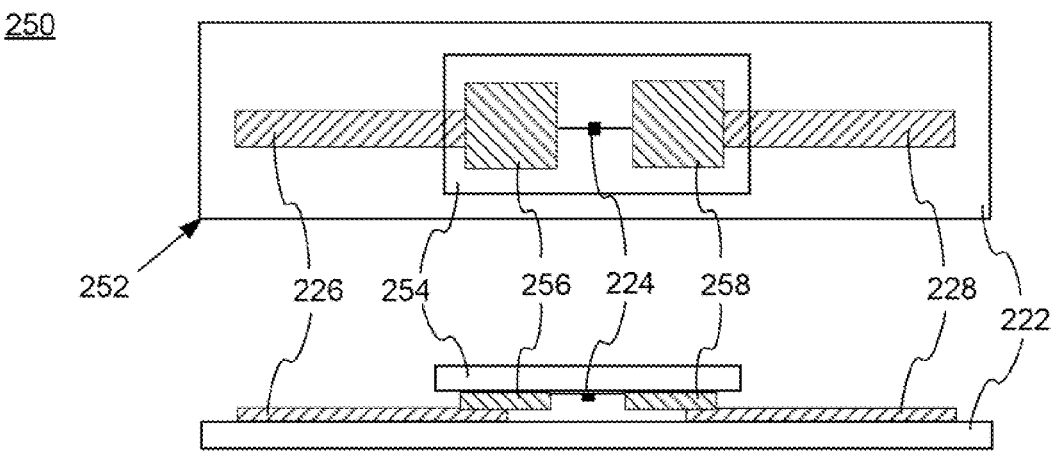
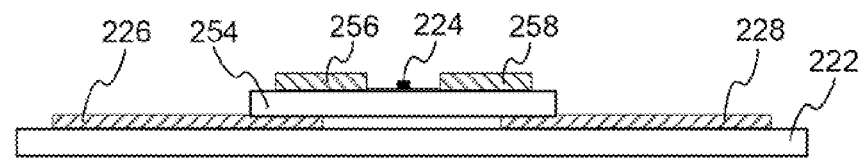
FIG. 2

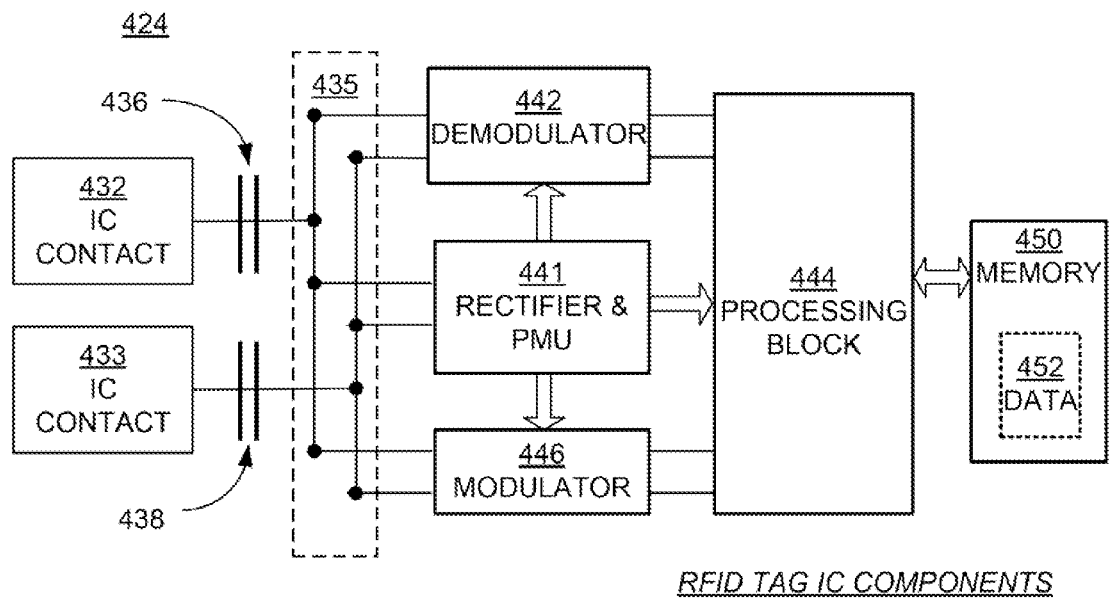
FIG. 4
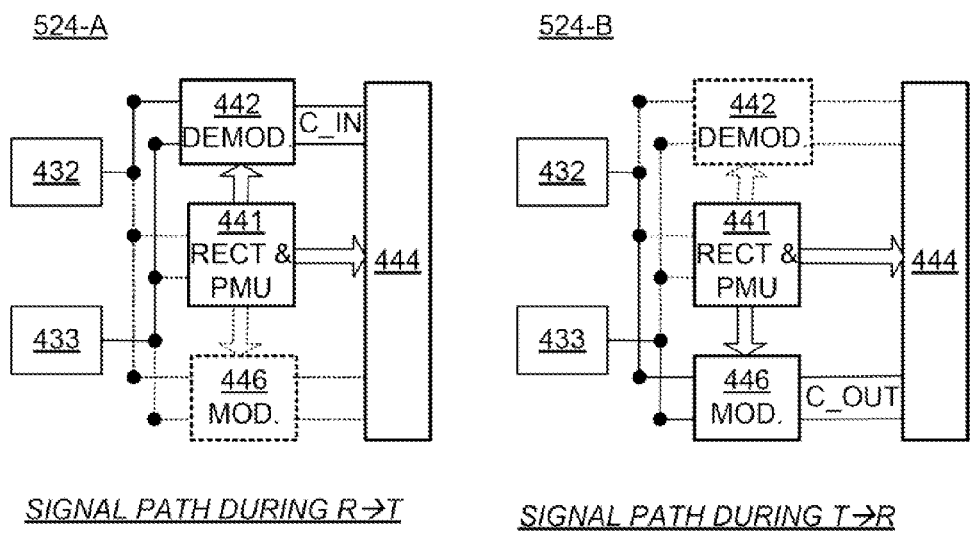
FIG. 5A  FIG. 5B

TAG-TO-TAG COMMUNICATION USING RFID READERS

CROSS REFERENCE TO RELATED APPLICATIONS

This application claims the benefit of U.S. Provisional Patent Application Ser. No. 62/059,070 filed on Oct. 2, 2014. The disclosures of the above applications are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions.

A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to RFID tag-to-tag communication using RFID readers. A first tag with a message intended for a second tag sends the message to an RFID reader. The reader then determines that the destination of the message is the second tag and sends the message to the second tag. The second tag may confirm receipt of the message by sending a receipt confirmation message to the reader for forwarding to the first tag, and/or the reader may itself confirm that the message was sent to the second tag by sending a transmit confirmation message to the first tag.

According to some embodiments, a method for an RFID reader to pass messages between RFID tags is provided. The method may include receiving a first message including data from a first tag, determining the data are intended for a second tag, and attempting to establish communications with the second tag. The method may further include transmitting a second message including at least a portion of the data to the second tag in response to establishing communications with the second tag, and in response to not establishing communications with the second tag, at least one of storing the data for subsequent transmission to the second tag, storing an error indication, and transmitting the error indication to the first tag.

According to other embodiments, an RFID reader configured to pass messages between RFID tags is provided. The reader may include a transceiver configured to transmit and receive signals from RFID tags and a processor block coupled to the transceiver. The processor block may be configured to receive a first message including data from a first tag, determine the data are intended for a second tag, attempt to establish communications with the second tag, and transmit a second message including at least a portion of the data to the second tag in response to establishing communications with the second tag.

According to further embodiments, a method for a first RFID tag to transmit data to a second tag is provided. The method may include determining at the first tag that data is to be transmitted to the second tag, determining at the first tag at least a portion of an identifier for the second tag, and transmitting the data and the portion of the identifier to a reader for subsequent transmission to the second tag.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 1 is a block diagram of components of an RFID system.

FIG. 2 is a diagram showing components of a passive RFID tag, such as a tag that can be used in the system of FIG. 1.

FIG. 4 is a block diagram showing a detail of an RFID tag, such as the one shown in FIG. 2.

FIGS. 5A and 5B illustrate signal paths during tag-to-reader and reader-to-tag communications in the block diagram of FIG. 4.

DETAILED DESCRIPTION

Figure 3:
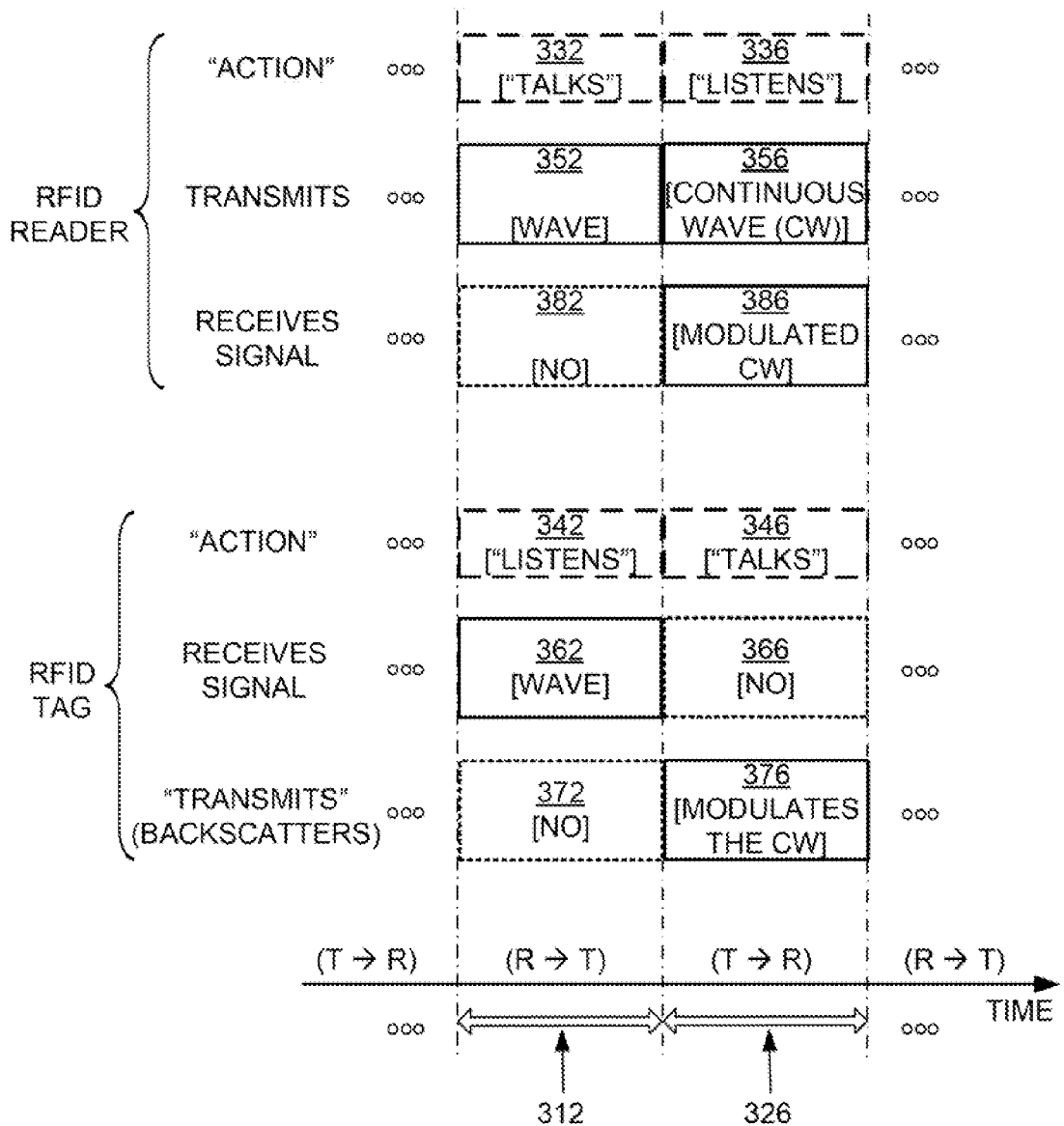
FIG. 3 is a conceptual diagram for explaining a half-duplex mode of communication between the components of the RFID system of FIG. 1.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art. Some portions of memory may be writeable and some not. "Command" refers to a reader request for one or more tags to perform one or more actions, and includes one or more tag instructions preceded by a command identifier or command code that identifies the command and/or the tag instructions. "Instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Specification"), versions 1.2.0 and 2.0 of which are hereby incorporated by reference.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals).

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable antenna contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive.

IC 224 is shown with a single antenna port, comprising two antenna contacts electrically coupled to two antenna segments 226 and 228 which are shown here forming a dipole. Many other embodiments are possible using any number of ports, contacts, antennas, and/or antenna segments.

Diagram 250 depicts top and side views of tag 252. Tag 252 differs from tag 220 in that it includes a substantially planar strap substrate 254 having strap contacts 256 and 258. The IC 224 is mounted on the strap substrate 254 such that antenna contacts/pads on the IC 224 electrically connect with the strap contacts 256 and 258 via suitable contact connections (not shown). The strap substrate 254 is then placed on the inlay 222 such that the strap contacts 256 and 258 electrically connect to the antenna segments 226 and 228. The strap substrate 254 may be affixed to the inlay 222 via pressing, an interface layer, one or more adhesives, or any other suitable means for securing the strap substrate 254 to the inlay 222.

Diagram 260 depicts a side view of an alternative way to place strap substrate 254 onto the inlay 222. Instead of having the surface of strap substrate 254 with strap contacts 256/258 face the surface of inlay 222 with antenna segments 226/228, strap substrate 254 is placed such that the surface opposite the strap contacts 256/258 faces the surface of inlay 222 with antenna segments 226/228. Strap contacts 256/258 can then be electrically connected to antenna segments 226/228 capacitively through strap substrate 254. In some embodiments, the relative positions of strap substrate 254 and inlay 222 may be reversed, with strap contacts 256/258 capacitively coupled to antenna segments 226/228 through inlay 222 instead of through strap substrate 254. Of course, in other embodiments strap contacts 256/258 may capacitively couple to antenna segments 226/228 through both inlay 222 and strap substrate 254.

In operation, the antenna receives a signal and communicates it to IC 224, which both harvests power and responds if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the antenna contacts of IC 224 can modulate the antenna's reflectance, as can varying the admittance of a shunt-connected circuit element which is coupled to the antenna contacts. Varying the impedance of a series-connected circuit element is another means of modulating the antenna's reflectance.

In the embodiment of FIG. 2, antenna segments 226 and 228 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, or any other suitable antenna.

The components of the RFID system of FIG. 1 may communicate with each other in any number of modes. One such mode is called full duplex. Another such mode is called half-duplex, and is described below.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a continuous wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two IC contacts 432, 433, suitable for coupling to antenna segments such as antenna segments 226/228 of RFID tag 220 of FIG. 2. When two IC contacts form the signal input from and signal return to an antenna they are often referred-to as an antenna port. IC contacts 432, 433 may be made in any suitable way, such as from metallic pads and so on. In some embodiments circuit 424 uses more than two IC contacts, especially when tag 220 has more than one antenna port and/or more than one antenna.

Circuit 424 includes signal-routing section 435 which may include signal wiring, signal-routing busses, receive/transmit switches, and so on that can route a signal to the components of circuit 424. In some embodiments IC contacts 432/433 couple galvanically and/or inductively to signal-routing section 435. In other embodiments (such as is shown in FIG. 4) circuit 424 includes optional capacitors 436 and/or 438 which, if present, capacitively couple IC contacts 432/433 to signal-routing section 435. This capacitive coupling causes IC contacts 432/433 to be galvanically decoupled from signal-routing section 435 and other circuit components.

Capacitive coupling (and resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In this situation, capacitors 436 and/or 438 galvanically decouple IC contact 432 from IC contact 433, thereby preventing the formation of a short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 also includes a rectifier and PMU (Power Management Unit) 441 that harvests energy from the RF signal received by antenna segments 226/228 to power the circuits of IC 424 during either or both reader-to-tag (R→T) and tag-to-reader (T→R) sessions. Rectifier and PMU 441 may be implemented in any way known in the art.

Circuit 424 additionally includes a demodulator 442 that demodulates the RF signal received via IC contacts 432, 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving IC contacts 432, 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a nonvolatile memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

FIG. 5A shows version 524-A of components of circuit 424 of FIG. 4, further modified to emphasize a signal operation during a R→T session during time interval 312 of FIG. 3. Demodulator 442 demodulates an RF signal received from IC contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226/228 of RFID tag 220 via IC contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as the Gen2 Specification mentioned above. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications. In addition, a protocol can be a variant of a stated specification such as the Gen2 Specification, for example including fewer or additional commands than the stated specification calls for, and so on. In such instances, additional commands are sometimes called custom commands.

Figure 6:
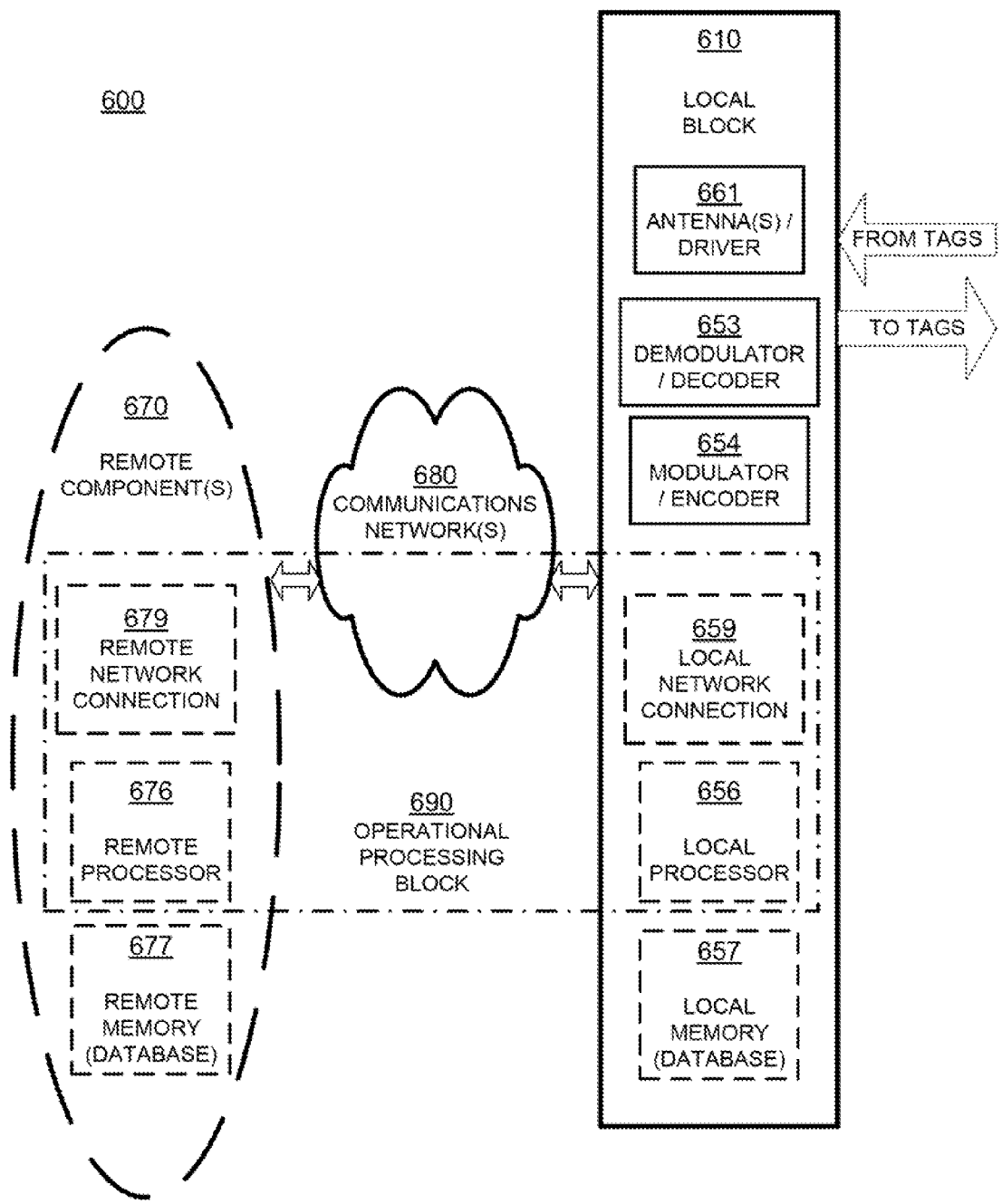
FIG. 6 is a block diagram showing a detail of an RFID reader system, such as the one shown in FIG. 1.

FIG. 6 is a block diagram of an RFID reader system 600 according to embodiments. RFID reader system 600 includes a local block 610, and optionally remote components 670. Local block 610 and remote components 670 can be implemented in any number of ways. It will be recognized that RFID reader 110 of FIG. 1 is the same as local block 610, if remote components 670 are not provided. Alternately, RFID reader 110 can be implemented instead by RFID reader system 600, of which only the local block 610 is shown in FIG. 1.

In some embodiments, one or more of the blocks or components of reader system 600 may be implemented as integrated circuits. For example, local block 610, one or more of the components of local block 610, and/or one or more of the remote component 670 may be implemented as integrated circuits using CMOS technology, BJT technology, MESFET technology, and/or any other suitable implementation technology.

Local block 610 is responsible for communicating with the tags. Local block 610 includes a block 651 of an antenna and a driver of the antenna for communicating with the tags. Some readers, like that shown in local block 610, contain a single antenna and driver. Some readers contain multiple antennas and drivers and a method to switch signals among them, including sometimes using different antennas for transmitting and for receiving. Some readers contain multiple antennas and drivers that can operate simultaneously. A demodulator/decoder block 653 demodulates and decodes backscattered waves received from the tags via antenna/driver block 651. Modulator/encoder block 654 encodes and modulates an RF wave that is to be transmitted to the tags via antenna/driver block 651.

Local block 610 additionally includes an optional local processor 656. Local processor 656 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 653, the encoding function in block 654, or both, may be performed instead by local processor 656. In some cases local processor 656 may implement an encryption or authentication function; in some cases one or more of these functions can be distributed among other blocks such as encoding block 654, or may be entirely incorporated in another block.

Local block 610 additionally includes an optional local memory 657. Local memory 657 may be implemented in any number of ways known in the art, including, by way of example and not of limitation, any of the memory types described above as well as any combination thereof. Local memory 657 can be implemented separately from local processor 656, or in an IC with local processor 656, with or without other components. Local memory 657, if provided, can store programs for local processor 656 to run, if needed.

In some embodiments, local memory 657 stores data read from tags, or data to be written to tags, such as Electronic Product Codes (EPCs), Tag Identifiers (TIDs) and other data. Local memory 657 can also include reference data that is to be compared to EPCs, instructions and/or rules for how to encode commands for the tags, modes for controlling antenna 651, secret keys, key pairs, and so on. In some of these embodiments, local memory 657 is provided as a database.

Some components of local block 610 typically treat the data as analog, such as the antenna/driver block 651. Other components such as local memory 657 typically treat the data as digital. At some point there is a conversion between analog and digital. Based on where this conversion occurs, a reader may be characterized as "analog" or "digital", but most readers contain a mix of analog and digital functionality.

If remote components 670 are provided, they are coupled to local block 610 via an electronic communications network 680. Network 680 can be a Local Area Network (LAN), a Metropolitan Area Network (MAN), a Wide Area Network (WAN), a network of networks such as the internet, or a local communication link, such as a USB, PCI, and so on. Local block 610 may include a local network connection 659 for communicating with communications network 680. Communications on the network can be secure, such as if they are encrypted or physically protected, or insecure if they are not encrypted or otherwise protected.

There can be one or more remote component(s) 670. If more than one, they can be located at the same location, or in different locations. They can access each other and local block 610 via communications network 680, or via other similar networks, and so on. Accordingly, remote component(s) 670 can use respective remote network connections. Only one such remote network connection 679 is shown, which is similar to local network connection 659, etc.

Remote component(s) 670 can also include a remote processor 676. Remote processor 676 can be made in any way known in the art, such as was described with reference to local processor 656. Remote processor 676 may also implement an authentication function, similar to local processor 656.

Remote component(s) 670 can also include a remote memory 677. Remote memory 677 can be made in any way known in the art, such as was described with reference to local memory 657. Remote memory 677 may include a local database, and a different database of a standards organization, such as one that can reference EPCs. Remote memory 677 may also contain information associated with commands, tag profiles, keys, or the like, similar to local memory 657.

Of the above-described elements, it may be useful to consider a combination of these components, designated as operational processing block 690. Operational processing block 690 includes those components that are provided of the following: local processor 656, remote processor 676, local network connection 659, remote network connection 679, and by extension an applicable portion of communications network 680 that links remote network connection 679 with local network connection 659. The portion can be dynamically changeable, etc. In addition, operational processing block 690 can receive and decode RF waves received via antenna/driver 651, and cause antenna/driver 651 to transmit RF waves according to what it has processed.

Operational processing block 690 includes either local processor 656, or remote processor 676, or both. If both are provided, remote processor 676 can be made such that it operates in a way complementary with that of local processor 656. In fact, the two can cooperate. It will be appreciated that operational processing block 690, as defined this way, is in communication with both local memory 657 and remote memory 677, if both are present.

Accordingly, operational processing block 690 is location independent, in that its functions can be implemented either by local processor 656, or by remote processor 676, or by a combination of both. Some of these functions are preferably implemented by local processor 656, and some by remote processor 676. Operational processing block 690 accesses local memory 657, or remote memory 677, or both for storing and/or retrieving data.

RFID reader system 600 operates by operational processing block 690 generating communications for RFID tags. These communications are ultimately transmitted by antenna/driver block 651, with modulator/encoder block 654 encoding and modulating the information on an RF wave. Then data is received from the tags via antenna/driver block 651, demodulated and decoded by demodulator/decoder block 653, and processed by operational processing block 690.

Embodiments of an RFID reader system can be implemented as hardware, software, firmware, or any combination. Such a system may be subdivided into components or modules. A person skilled in the art will recognize that some of these components or modules can be implemented as hardware, some as software, some as firmware, and some as a combination. An example of such a subdivision is now described, together with the RFID tag as an additional module.

Figure 7:
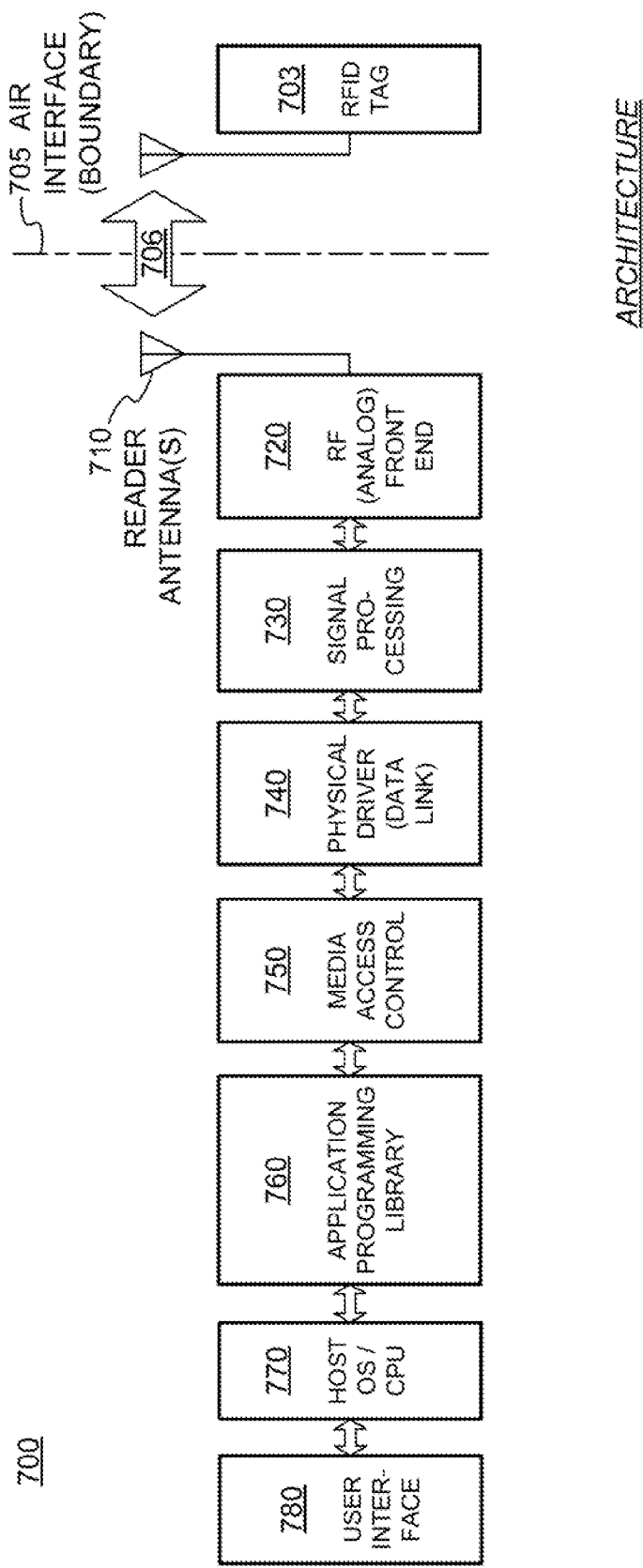
FIG. 7 is a block diagram illustrating an overall architecture of an RFID system according to embodiments.

FIG. 7 is a block diagram illustrating an overall architecture of an RFID system 700 according to embodiments. RFID system 700 may be subdivided into modules or components, each of which may be implemented by itself or in combination with others. In addition, some of them may be present more than once. Other embodiments may be equivalently subdivided into different modules. Some aspects of FIG. 7 are parallel with systems, modules, and components described previously.

An RFID tag 703 is considered here as a module by itself. RFID tag 703 conducts a wireless communication 706 with the remainder, via the air interface 705. Air interface 705 is really a boundary, in that signals or data that pass through it are not intended to be transformed from one thing to another. Specifications as to how readers and tags are to communicate with each other, for example the Gen2 Specification, also properly characterize that boundary as an interface.

RFID system 700 includes one or more reader antennas 710, and an RF front-end module 720 for interfacing with reader antenna(s) 710. These can be made as described above.

RFID system 700 also includes a signal-processing module 730. In one embodiment, signal-processing module 730 exchanges waveforms with RF front-end module 720, such as I and Q waveform pairs.

RFID system 700 also includes a physical-driver module 740, which is also known as data-link module. In some embodiments physical-driver module 740 exchanges bits with signal-processing module 730. Physical-driver module 740 can be the stage associated with the framing of data.

RFID system 700 additionally includes a media access control module 750. In one embodiment, media access control layer module 750 exchanges packets of bits with physical driver module 740. Media access control layer module 750 can make decisions for sharing the medium of wireless communication, which in this case is the air interface.

RFID system 700 moreover includes an application-programming library-module 760. This module 760 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 770. In some embodiments, the processor is not considered as a separate module, but one that includes some of the above-mentioned modules of RFID system 700. In some embodiments the one or more processors may perform operations associated with retrieving data that may include a tag public key, an electronic signature, a tag identifier, an item identifier, and/or a signing-authority public key. In some embodiments the one or more processors may verify an electronic signature, create a tag challenge, and/or verify a tag response.

User interface module 780 may be coupled to application-programming-library module 760, for accessing the APIs. User interface module 780 can be manual, automatic, or both. It can be supported by the host OS/CPU module 770 mentioned above, or by a separate processor, etc.

It will be observed that the modules of RFID system 700 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other direction for transmitting RFID waveforms. In receiving mode, reader antenna(s) 710 receives wireless waves, which are in turn processed successively by the various modules in the chain. Processing can terminate in any one of the modules. In transmitting mode, waveform initiation can be in any one of the modules. Ultimately, signals are routed to reader antenna(s) 710 to be transmitted as wireless waves.

The architecture of RFID system 700 is presented for purposes of explanation, and not of limitation. Its particular, subdivision into modules need not be followed for creating embodiments. Furthermore, the features of the present disclosure can be performed either within a single one of the modules, or by a combination of them.

As mentioned previously, embodiments are directed to RFID tag-to-tag communication using RFID readers.

Embodiments additionally include programs, and methods of operation of the programs. A program is generally defined as a group of steps or operations leading to a desired result, due to the nature of the elements in the steps and their sequence. A program may be implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions, data, keys, signatures, and other data of a program made according to the embodiments. A storage medium according to the embodiments is a computer-readable medium, such as a memory, and is read by a processor of the type mentioned above. If a memory, it can be implemented in any of the ways and using any of the technologies described above.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

In some situations, a tag population may include specialized tags having particular features or capabilities and other tags that do not have those particular features. For example, specialized tags may be configured to sense the environment (e.g., to sense vibration, temperature, humidity, light levels, chemical presence, radiation, etc.). As another example, specialized tags may be configured to perform cryptographic or authentication operations.

In some embodiments, a tag population that includes specialized tags with certain features and other tags without those features may be configured to allow the other tags to take advantage of those certain features, by using a reader as a message relay. For example, suppose that a refrigerated container stores a number of RFID-tagged items that are temperature sensitive, and the items are to be monitored to ensure that their temperatures do not exceed a particular threshold. Instead of having each RFID tag configured to independently determine temperature, some subset of the tags, or one or more other tags associated with the refrigerated container, may be configured with temperature-sensing capability. These temperature-sensing tags may then be configured to measure the temperature within the container (based on some predetermined or dynamic schedule) and update the other, non-temperature-sensing tags by using one or more RFID readers as relays. For example, a temperature-sensing tag may occasionally transmit temperature data to other tags for storage, as a kind of temperature log, or may cause other tags to store a temperature warning or flag if the sensed temperature exceeds the threshold. Subsequently, a user or customer may inventory one or more of the other tags and be able to determine that the temperature of the tagged items have exceeded the temperature threshold. Accordingly, even though only a subset of tags are configured with temperature-sensing capabilities, all of the tags in the population may be able to share the temperature-sensing capabilities of the subset.

In some embodiments, the specialized tags described herein may be further configured to at least partially control reader-tag interactions. Many RFID systems with readers and tags are configured such that a reader (or a controller coupled to a reader) initiates reader-tag interactions while the tags respond. For example, a reader determines whether, when, and how reader commands are to be transmitted to tags, and the tags respond accordingly. In some embodiments, an RFID system may be configured such that tags take some role in controlling reader-tag interactions. For example, a tag may determine that some data is to be written to or read from another tag. In response, the tag may use a reader as a message relay, by indicating to the reader how and/or when the data is to be written to or read from the other tag. In some embodiments, the tag itself may act as a controller for the reader.

Figure 8:
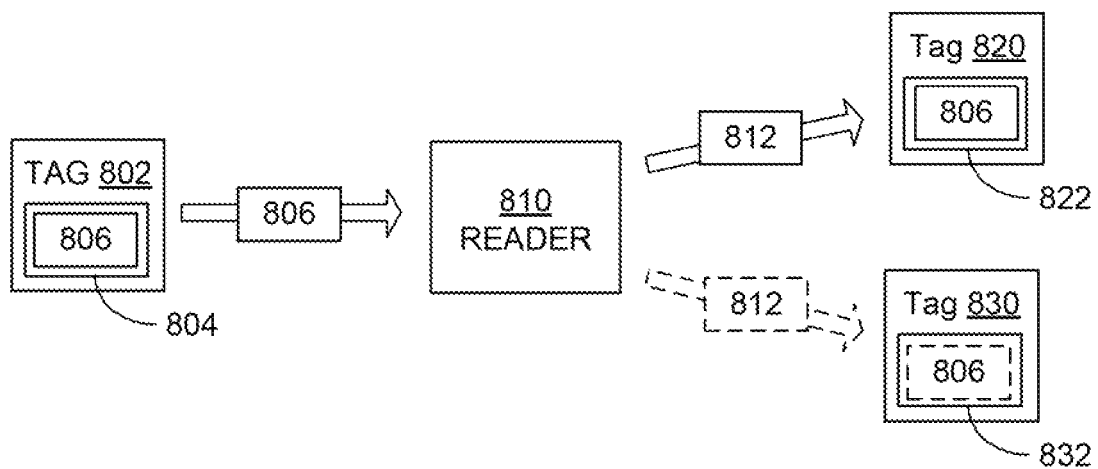
FIG. 8 is a conceptual diagram of how RFID readers can be used to pass messages between RFID tags, according to embodiments.

FIG. 8 is a conceptual diagram of how RFID readers can be used to pass messages between RFID tags, according to embodiments. Diagram 800 depicts RFID reader 810 and RFID tags 802, 820, and 830. Reader 810 may be able to communicate with tags 802, 820, and 830 at some point in time. For example, tags 802, 820, and 830 may be within the field-of-view of reader 810 at substantially the same time. As another example, only one or two of tags 802, 820, and 830 may be in the field-of-view of reader 810 at a particular time, but all three tags 802, 820, and 830 may be within the field-of-view of reader 810 over some period of time.

In some embodiments, tag 802 may wish to transmit a message 806 containing commands, data, or other suitable data to tag 820 and/or tag 830. For example, suppose that tag 802 is configured to sense or receive sensor data about its environment, such as vibration, temperature, humidity, light levels, and/or presence of chemicals. In contrast, tags 820 and 830, present in the same environment, may not be capable of sensing the environment, and furthermore may be associated with items that are sensitive to some aspect of the environment, such as being light-, temperature-, or chemically-sensitive. In this situation, tag 802 may transmit the sensed environmental data to tags 820 and 830. Tags 820 and 830 may then store the sensed environmental data to provide a record of potentially harmful environmental exposures for their associated items.

Message 806 may represent a fully-formed tag response (for example, a tag response to a previous reader command or request), or may represent the payload of such a tag response. In some embodiments, message 806 may be a portion of a longer message. In some embodiments, some or all of message 806 or a longer message of which message 806 is a component may be cryptographically protected using encryption and/or authentication techniques. These techniques might be based on either symmetric or asymmetric cryptography. The secret or private keys for any cryptographic operation might be known to a specific set of tags, to a single tag, as well as potentially to a set of readers or otherwise authorized entities. In some embodiments, tag 802 may store message 806 in a tag memory 804, or may generate message 806 as it is sent.

Tag 802 may then indicate to reader 810 that it has a message intended for one or more other tags. For example, tag 802 may assert a message flag for reader 810 to read, or may include a message indicator or the message 806 in a response to reader 810. Reader 810 may then read message 806 from tag 802, if tag 802 has not already provided message 806 to reader 810 in a previous tag response.

In some embodiments, message 806 may be intended for one or more particular tags. In these situations, tag 802 may provide a destination tag identifier to reader 810. Tag 802 may include the destination tag identifier in message 806 (e.g., inserted or concatenated) or may send the destination tag identifier separately to reader 810 (e.g., in a separate message). In some embodiments, tag 802 may store the destination tag identifier near message 806 in tag memory 804 or may store the destination tag identifier at an entirely different location in tag memory 804. Reader 810 may then use the destination tag identifier associated with message 806 to identify one or more destination tags for message 810. The destination tag identifier may include identifier(s) for one or more specific tags, such as a tag identifier (TID), an electronic product code (EPC), and/or a serialized global trade item number (SGTIN). The destination tag identifier may also (or instead) include identifier(s) for a group or class of tags, such as a global trade item number (GTIN), a non-serialized or non-unique portion of a TID or EPC, a tag or tag IC manufacturer identifier, a customer identifier, or any other suitable identifier associated with one or more tags. In some embodiments, the destination tag identifier may identify tags with particular features. For example, the destination tag identifier may identify tags that lack certain capabilities, such as environmental sensing, cryptographic operations, or other capabilities. In other embodiments, the destination tag identifier may identify tags in a particular location. For example, the destination tag identifier may identify tags in a particular container but not in an adjacent container.

Reader 810 may also provide the destination tag identifiers instead of or in addition to tag 802. In some embodiments, tag 802 may know the identity of tags 820/830, but may not know the particular identifiers used to identify tags 820/830 during reader-tag communication. For example, reader 810 may identify tags 820/830 using tag handles or random/pseudorandom numbers (for example, as described in the Gen2 Specification) that are not necessarily known to tag 802. In this situation, reader 810 may convert destination tag identifiers provided by tag 802 into the appropriate tag identifiers. In some embodiments, tag 802 may not know the identity of tags 820/830 at all. In this case, reader 810 may identify the appropriate tags to receive message 806, for example based on one or more defining characteristics provided by tag 802 or known by reader 810. In one embodiment, tag 802 may indicate that message 806 is to be provided to any tag that reader 810 can communicate with, or only to tags associated with items in a particular location or a particular container. In response, reader 810 may identify the corresponding tags (for example, via querying or inventorying) and provide message 806 to the identified tags.

In embodiments where message 806 is a portion of a longer message, message 806 may include or be associated with a portion identifier to enable a message recipient to reassemble the longer message from the message portions. The portion identifier associated with a particular message portion may identify the particular message portion, the total number of portions in the message, the originator of the message, or any other information related to the message or the message reassembly process.

Reader 810, upon determining that it has received a message intended for one or more identified destination tags, may attempt to establish communications with the identified destination tag(s), for example by determining whether the destination tag(s) are visible (i.e., in its field-of-view) and successfully receive and respond to reader commands. For example, if message 806 is associated with a destination tag identifier identifying tag 820 and/or tag 830, reader 810 may determine whether tag 820 and/or tag 830 are visible and can successfully receive and respond to commands. Reader 810 may determine whether communications can be established with a particular tag by performing a querying or inventorying process (for example, as described in the Gen2 Specification) to retrieve identifiers associated with visible tags.

If reader 810 determines that communications can be established to at least one destination tag, it may send message 812 to the visible destination tag(s). For example, as depicted in FIG. 8, reader 810 may send message 812 to tag 820 and tag 830. In some embodiments, message 812 may be identical to message 806. In other embodiments, message 812 may include additional information over message 806 and/or exclude information present in message 806. Such information may include routing information, destination tag identifiers (as described above), originating tag identifiers (e.g., an identifier for tag 802), relaying reader identifiers (e.g., an identifier for reader 810), timestamps for receipt and/or transmission of messages 806 and/or 812, or any other suitable information.

On the other hand, if reader 810 determines that communications cannot be established with any destination tags, reader 810 may enter a failure state. In the failure state, reader 810 may discard the message 806 and/or transmit an error indication to tag 802 indicating that message 806 could not be successfully transmitted to the destination tag(s). In some embodiments, reader 810 may also (or instead) store the error indication, along with identifiers for the originating tag (tag 802) and the destination tags and optionally timestamps for the failed transmission(s).

In some embodiments, reader 810 may not discard the message 806 and/or transmit/store the error indication immediately, and instead may attempt to re-deliver message 806 at a later time. In this situation, reader 810 may store the message 806 until communications can be established with a destination tag or until a particular time period has elapsed. For example, reader 810 may be configured to store message 806 for a dynamically-determined or predefined time period. In some embodiments, reader 810 may be configured to store message 806 until the memory space occupied by message 806 is to be used for another purpose. In other embodiments, message 806 may include or be associated with an expiration time, and reader 810 may be configured to discard message 806 when the expiration time is reached. Similarly, in embodiments where message 806 is associated with multiple destination tags (e.g., tag 820 and tag 830) and reader 810 is only able to send message 806 to one of the tags, reader 810 may retain message 806 until one or more of the above criteria have been met.

Tags 820 and/or 830 may then process the received message 812. For example, if message 812 includes one or more commands, tags 820/830 may comply with the included commands. If message 812 includes data, tags 820/830 may store the received data, use the data to modify existing stored data, and/or modify a tag operating condition or state.

In some embodiments, tags 820/830 may validate the message 812 by determining whether the message 812 is complete and/or authentic before processing any data included in the message 812. For example, message 812 may include or be associated with a portion identifier (described above) if it is a portion of a longer message. Tags 820/830 may read the portion identifiers associated with received messages and use the portion identifiers to determine if a complete message has been received or if some message portions have not been received.

In some embodiments, messages 806 and/or 812 may include check code(s) that can be used to verify the correctness of an associated message or message portion. For example, a message or message portion may include a check code such as a parity bit or bits, a checksum, a cyclic redundancy check, a hash function output, an error-correcting code, or any other suitable error-checking or correcting code. The reader 810 or the tags 820/830 may then use the check code to determine if the message has been corrupted or otherwise damaged during transit.

Messages 806/812 may also (or instead) be electronically secured by tag 802, reader 810, or some other authority. For example, the message(s) may be encrypted and/or include a cryptographically-derived authentication code such as a digital signature, message authentication code, or any other suitable cryptographic code. A receiving entity, such as reader 810 or tags 820/830, may then be able to verify that the message is correct, was sent from a particular source, and was not modified during transit.

In some embodiments, tags 802, 820, 830, and reader 810 may also (or instead) be cryptographically authenticated to each other via a separate process. For example, tags 802, 820, and 830 may be authenticated to the reader via a challenge-response protocol, or the reader may be authenticated to the tag, or both parties might be mutually authenticated. Alternatively tags and readers might have previously set up cryptographically-secure communication channel(s) with reader 810 using, for example, a handshake process involving a secret key, a public key, a private key, and/or a shared key. The tags 802, 820, and 830 may then exchange messages 806/812 with reader 810 over the cryptographically-secure communication channels.

In certain embodiments, tag 802, reader 810, and/or tags 820/830 may authenticate each other by determining whether they appear on an approval list. The approval list may include the tags and/or readers that are authorized (for example, by an authority) to send messages to other tags, receive messages from other tags, or perform message relaying. In the example described above, tag 802 may first determine whether reader 810 is on an approval list before sending message 806 to reader 810. Similarly, reader 810 may determine whether tag 802 is on an approval list before accepting message 806, and may also determine whether tags 820/830 are on an approval list before sending message 812. Tags 820/830 in turn may determine whether tag 802 and/or reader 810 are on an approval list before executing and/or storing the contents of message 812.

Figure 9:
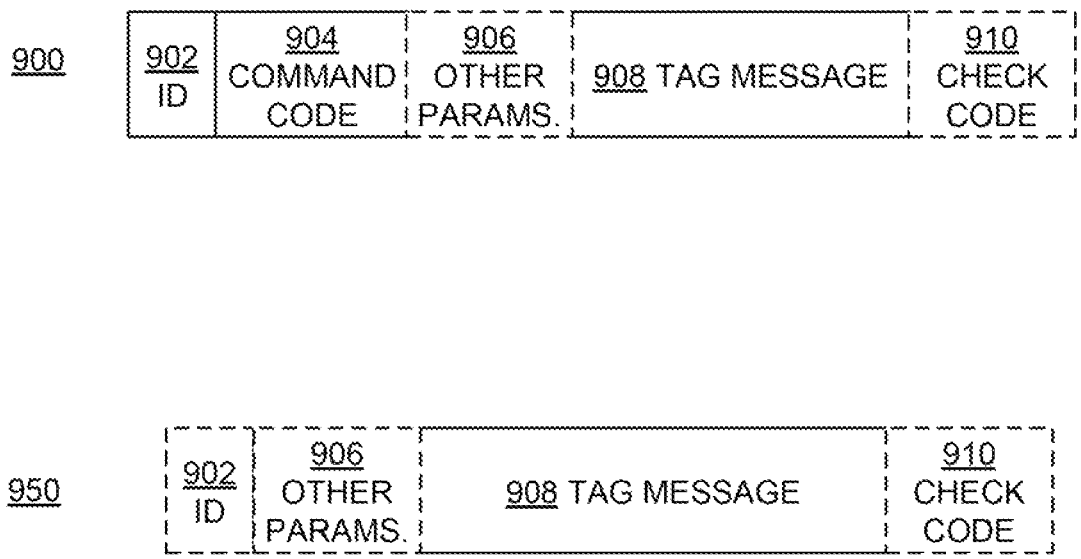
FIG. 9 depicts messages that a reader may send to tags, according to embodiments.

As described above, a message from a reader (e.g. message 812) that includes a message from a tag and intended for one or more destination tags may be identical to the message from the tag, may include additional information over the message from the tag, or may exclude information present in the message from the tag. FIG. 9 depicts messages that a reader may send to tags, according to embodiments. A reader such as reader 810 may receive a tag message 908 (e.g., message 806) from a tag and intended for one or more destination tags. In one embodiment, the reader may construct a reader message to send to the destination tags by concatenating or inserting additional data to the received tag message 908. The reader may do this because the tag message 908 is not a fully-formed command or is otherwise unsuitable for transmission to tags according to a protocol. In some embodiments, tag message 908 may specify the form of the reader message to be transmitted to the destination tags, and may include instructions and parameters necessary for the reader to assemble the reader message. If tag message 908 is a fully-formed command, in some situations the reader may encapsulate the tag message 908 in the payload of another reader command. The reader may also add additional data to identify the reader, to provide a timestamp that indicates when tag message 908 was received or when the reader message is sent to the destination tag(s), to cryptographically secure the message, or to provide any other suitable logging information.

In one embodiment, the reader may construct message 900 from tag message 908, by concatenating or inserting an ID 902, a command code 904, optional other parameter(s) 906, and optional check code 910. ID 902 identifies one or more destination tags, and may include one or more of the destination tag identifiers described in FIG. 8s. Command code 904 may be a command identifier or command code that identifies a particular command according to a protocol or a specification, as described above and in the Gen2 Specification.

In some embodiments, message 900 may include optional other parameters 906. Parameters 906 may include data necessary to complete a reader command as identified by command code 904, may include additional data as described above (e.g., reader identifier, timestamp, electronic signature, logging information, etc.), or may include any other suitable data. Message 900 also includes tag message 908, which may be identical to the message received from the tag, stripped of redundant data (e.g., destination tag identifiers), and/or encrypted. Message 900 may further include optional check code 910, which may be an error-checking or error-correction code (e.g., a cyclic redundancy check) computed over the entire message 900 or a portion of message 900.

In other embodiments, the reader may send the tag message 908 substantially as-is, or with the inclusion of minimal necessary data. For example, tag message 908 may be a bitstream corresponding to a fully-formed command according to a protocol that is known or unknown to the reader. In this case the reader may forward tag message 908 to the destination tag(s) as message 950, with little or no added information. In a situation where tag message 908 corresponds to a fully-formed command according to a protocol that is unknown to the reader, tag 802 may also provide transmission timing parameters, form tag message 908, or otherwise cause the reader to be adjusted such that the reader can transmit tag message 908 according to the protocol.

Message 950 includes tag message 908, and may also include optional ID 902, other parameter(s) 906, and/or check code 910, as described above. As previously mentioned, in some embodiments the originating tag that sent tag message 908 may not know the particular identifier used to identify the destination tag(s) during reader-tag communication. For example, a reader may identify a target tag using a tag handle or random/pseudorandom number that is not necessarily known to the originating tag. In this situation, the reader may add the tag handle to the tag message, and may also calculate check code 910 based on the added tag handle.

Figure 10:
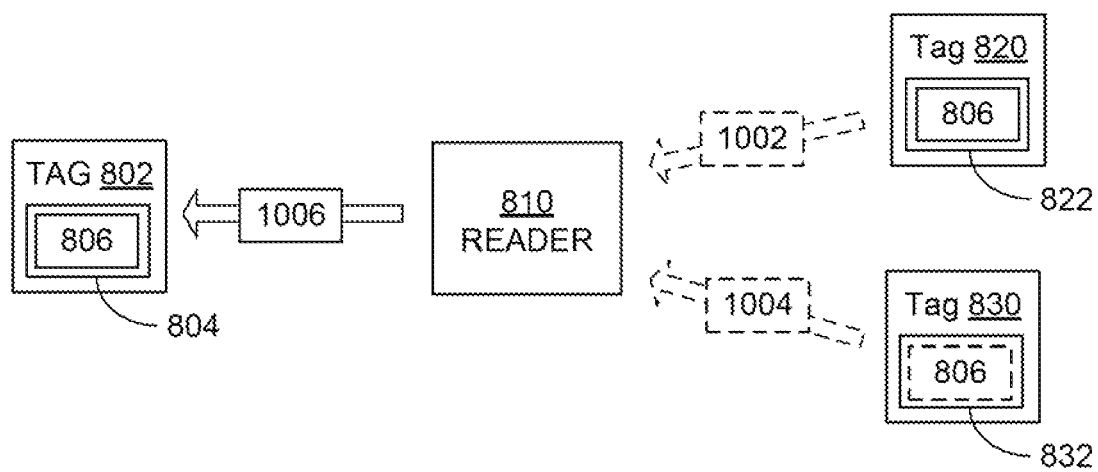
FIG. 10 is a conceptual diagram of how RFID readers can be used to pass notifications between RFID tags, according to embodiments.

Upon the successful transmission of a tag message to one or more destination tags, the destination tags and/or the reader may notify the originating tag accordingly. FIG. 10 is a conceptual diagram of how RFID readers can be used to pass notifications between RFID tags, according to embodiments. Diagram 1000, similar to diagram 800, illustrates an example situation after reader 810 has sent message 812 to tag 820 and optionally tag 830. After tags 820 and/or 830 receive message 812 and optionally confirms the completeness and/or authenticity of message 812, tags 820/830 may send notifications 1002/1004 to reader 810 confirming receipt of message 812. Notifications 852/854 may include information about the tags 820/830, the reader 810, the messages 806 or 812, and/or other receipt information (e.g., timestamps), and may be electronically secured (e.g., electronically signed or encrypted).

Reader 810 may then send notification 1006 to tag 802 to notify tag 802 that tags 820/830 have received message 806. If tags 820/830 determines that message 812 is incomplete or fails to authenticate message 812, tags 820/830 may instead send notifications 1002/1004 to reader 810 indicating a message reception failure. In some embodiments, reader 810 may send notification 1006 to notify tag 802 that it has either successfully sent message 806 to tags 820/830 or has failed to send message 806 to tags 820/830. In these embodiments, tags 820/830 may or may not also provide notifications 1002/1004 indicating successful or failed receipt of message 812.

In some embodiments, notifications 1002, 1004, and/or 1006 may be encrypted or include cryptographically-generated authentication codes to indicate that they originated from tags 820, 830, and reader 810, respectively. Tag 802 may then be able to verify that the notifications 1002, 1004, and/or 1006 did in fact originate from tags 820, 830, and/or reader 810, respectively, and were not tampered with in transit. In some embodiments, tags 802, 820, 830 and reader 810 may instead (or also) communicate over cryptographically-secured channels, as described above in FIG. 8.

As described above, if reader 810 determines that communications cannot be established with any destination tags, it may enter a failure state. In some embodiments, reader 810 may also attempt to identify one or more relay tags or readers to forward the message 806 onward to its eventual destination. In these embodiments, reader 810 may select relay tags or readers based on one or more criteria. For example, reader 810 may select relay tags or readers based on their current or future proximity to the destination tag(s).

In some embodiments, tags suitable for relaying purposes may store information about the different readers that can read them. For example, if a tag is visible to two or more different readers, the tag may store identifiers for the two or more different readers. The tag may also store one or more time indicators associated with the reader identifiers to determine when it is visible to a particular reader. Similarly, a reader suitable for relaying purposes may store information about different tags (suitable for relaying or not) in its field-of-view. For example, if a reader has two or more different tags in its field-of-view, the reader may store identifiers for the tag(s), and may also store time indicator(s) associated with the tag identifiers to determine when the different tags are visible to the reader. In some embodiments, a reader may store a list of possible destination readers and tags and the potential relay pathways (via both tags and readers) to those destination readers or tags. By consulting the list, the reader can determine which particular relay pathways (including tags and/or readers) it can use to pass messages to particular destinations.

While in the embodiments above notifications are sent to the originating tag (i.e., tag 802) by the same reader (i.e., reader 810) used to send the message to the destination tags, this need not be the case. For example, tags 820 and 830 may send notifications 852 and 854 to different readers for eventual transmission to tag 802.

Figure 11:
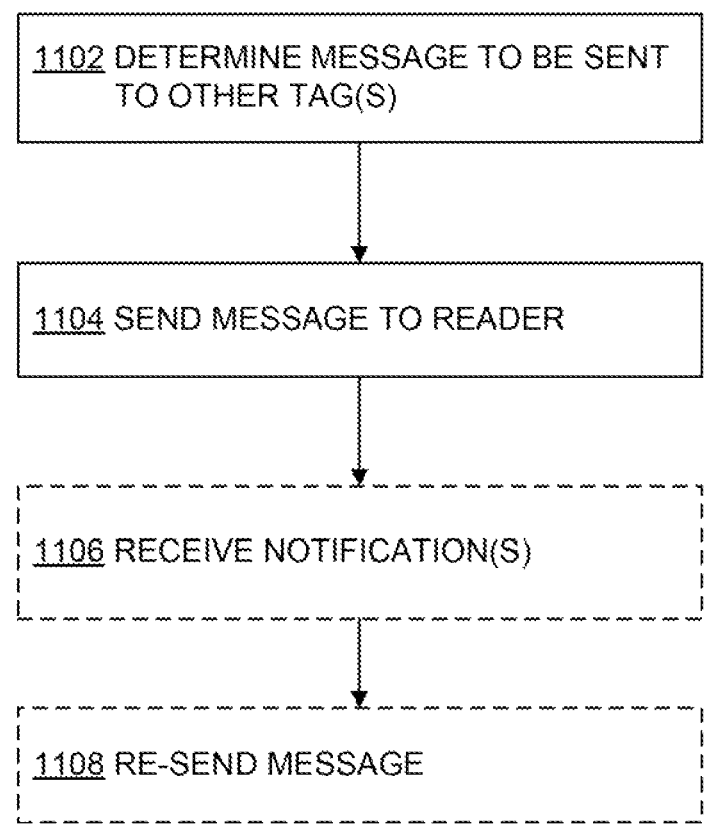
FIG. 11 is a flowchart depicting a process for an RFID tag to send a message to another tag via an RFID reader, according to embodiments.

FIG. 11 is a flowchart depicting a process 1100 for an RFID tag to send a message to another tag via an RFID reader. Process 1100 begins at step 1102, where a tag (e.g., tag 802) determines that a message is to be sent to one or more other destination tags (e.g., tags 820/830). The message may be data that is stored at the tag, may be data generated by the tag as a result of the determination, or may be a fully-formed command that complies with one or more protocols, such as the Gen2 Specification. In some embodiments, the message may include or be associated with one or more destination tag identifiers that identify the destination tags, as described above. At step 1104, the tag sends the message to a reader (e.g., reader 810), along with one or more destination tag identifiers. In some embodiments, the tag may provide an indication to the reader that the tag has a message to send to the destination tags. The tag may store the message in tag memory and backscatter the message to the reader in response to a reader command (e.g., a read command).

In some embodiments, at optional step 1106 the tag may receive one or more notifications originating from the destination tags and/or the reader, as described above. In some embodiments, the tag may take action based on the received notifications. For example, if the received notifications indicate that a destination tag was unable to confirm the completeness or authenticity of the message the tag may re-send the message at optional step 1108.

Figure 12:
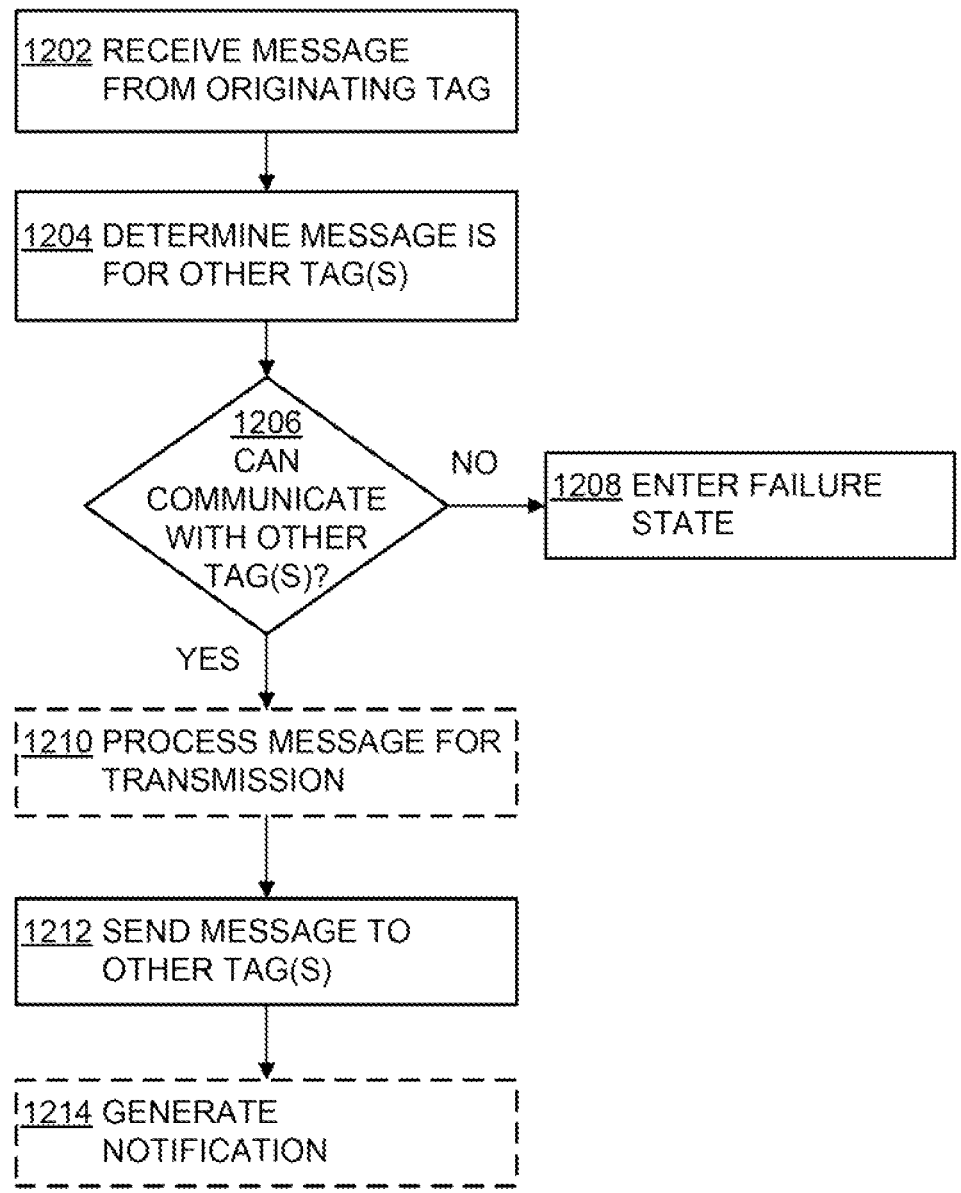
FIG. 12 is a flowchart depicting a process for an RFID reader to relay a message between RFID tags, according to embodiments.

FIG. 12 is a flowchart depicting a process 1200 for an RFID reader to relay a message between RFID tags. Process 1200 begins at step 1202, where a reader (e.g., reader 810) may receive a message from an originating tag. At step 1204, the reader may determine that the received message is for one or more other destination tags. For example, the received message may include a destination tag identifier as described above, or the reader may read a separate destination tag identifier from the tag. The destination tag identifier may identify a set or class of tags, or may only identify a single tag.

At step 1206, the reader determines whether it can establish communications with the other tags. For example, the reader may determine whether the other tag(s) are visible and can successfully receive and respond to reader commands. In some embodiments, the reader may also determine whether the other tag(s) can be reached via one or more relay tags or readers, as described above.

If at step 1206 the reader determines that it cannot establish communications with the other tags, then at step 1208 the reader may enter a failure state. In the failure state, the reader may discard the message, transmit an error indication to the originating tag, store the error indication, and/or store identifiers for the originating tag and/or the other tags. The reader may immediately perform one or more of these actions, or wait for a particular, predetermined or dynamic time before performing these action(s). In the latter situation, the reader may periodically attempt to establish communications with the other tags. If successful, the reader may proceed to send the message as described below.

If at step 1206 the reader determines that it can establish communications with the other tags, then at optional step 1210 the reader may process the message for transmission. For example, the reader may include or exclude routing information, destination tag identifiers, originating tag identifiers, relaying reader identifiers, timestamps, or any other suitable information. In some embodiments, the reader may add or remove information from the message as described above in FIG. 9.

At step 1212 the reader may then send the message, processed or not, to the other tag(s). If only a subset of destination tags are visible to the reader, the reader may only send the message to the visible destination tags and store the message as described above until the other destination tags are visible. In some embodiments, the reader may identify one or more other tags or readers to use as relays for transmitting the message to the destination tag(s). For example, if the reader determines that none of the destination tags are visible and none will likely be visible within a particular time duration, then the reader may select one or more relay tags or readers to forward the message onward to the destination tags, as described above.

In some embodiments, at optional step 1214 the reader may generate a notification as described above in FIG. 10, and may send the notification to the originating tag and/or store the notification at the reader. The notification may originate from the reader and/or from the destination tag(s), and may indicate whether the message was successfully sent to the destination tag(s), whether the destination tag(s) successfully processed the message, whether the message is complete, and/or whether the destination tag(s) successfully authenticated the message.

The steps described in processes 1100 and 1200 are for illustration purposes only. Tag-to-tag message passing may be performed employing additional or fewer steps and in different orders using the principles described herein. Of course the order of the steps may be modified, some steps eliminated, or other steps added according to other embodiments.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented, according to embodiments formed, individually and/or collectively, by a wide range of hardware, software, firmware, or virtually any combination thereof.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more") the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations." without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

We claim:

1. A method for a Radio Frequency Identification (RFID) reader to pass messages between RFID tags, the method comprising:
   receiving a first message including data from a first tag;
   determining the data are intended for a second tag;
   attempting to establish communications with the second tag;
   in response to establishing communications with the second tag, transmitting a second message including at least a portion of the data to the second tag; and
   in response to not establishing communications with the second tag, at least one of:
      storing the data for subsequent transmission to the second tag;
      storing an error indication; and
      transmitting the error indication to the first tag.

2. The method of claim 1, wherein determining the data are intended for the second tag comprises receiving, from the first tag, at least a portion of an identifier of the second tag.

3. The method of claim 2, wherein the first message includes the at least a portion of the identifier.

4. The method of claim 1, wherein transmitting the second message to the second tag comprises:
   concatenating a command code to the portion of the data to form a command; and
   transmitting the command to the second tag.

5. The method of claim 1, further comprising:
   authenticating at least one of the first tag, the second tag, and the first message.

6. The method of claim 5, wherein the authenticating comprises at least one of:
   verifying an electronic signature; and
   decrypting an encrypted value.

7. The method of claim 5, wherein the authenticating comprises determining that an identifier associated with at least one of the first tag and the second tag is on an approval list.

8. A Radio Frequency Identification (RFID) reader configured to pass messages between RFID tags, the reader comprising:
   a transceiver configured to transmit and receive signals from RFID tags; and
   a processor block coupled to the transceiver and configured to:
      receive a first message including data from a first tag;
      determine the data are intended for a second tag;
      attempt to establish communications with the second tag;
      in response to establishing communications with the second tag, transmit a second message including at least a portion of the data to the second tag.

9. The reader of claim 8, wherein the processor block is further configured to, in response to not establishing communications with the second tag, at least one of:
   storing the data for subsequent transmission or discarding the data; and
   transmit an error indication to the first tag or store the error indication.

10. The reader of claim 8, wherein the processor block is further configured to:
   receive, from the first tag, at least a portion of an identifier of the second tag; and
   determine the data are intended for the second tag based on the identifier.

11. The reader of claim 8, wherein the processor block is further configured to:
   concatenate a command code to the portion of the data to form a command; and
   transmit the command to the second tag as the second message.

12. The reader of claim 8, wherein the processor block is further configured to authenticate at least one of the first tag, the second tag, and the first message.

13. The reader of claim 12, wherein the processor block is further configured to perform the authentication by at least one of verifying an electronic signature and decrypting an encrypted value.

14. The reader of claim 12, wherein the processor block is further configured to perform the authentication by determining that an identifier associated with at least one of the first tag and the second tag is on an approval list.

* * * * *

UNITED STATES PATENT AND TRADEMARK OFFICE
CERTIFICATE OF CORRECTION

PATENT NO. : 9,740,891 B1
APPLICATION NO. : 14/871634
DATED : August 22, 2017
INVENTOR(S) : Matthew Robshaw et al.

Page 1 of 1

It is certified that error appears in the above-identified patent and that said Letters Patent is hereby corrected as shown below:

In the Specification

Column 8, Line 62, Delete "computer:" and insert -- computer; --, therefor.

Column 21, Line 27, After "more")" insert -- ; --.

Column 21, Line 33, Delete "recitations.""" and insert -- recitations," --, therefor.

Signed and Sealed this
Sixteenth Day of January, 2018

Joseph Matal
*Performing the Functions and Duties of the
Under Secretary of Commerce for Intellectual Property and
Director of the United States Patent and Trademark Office*